(12) United States Patent
Saraidaridis et al.

(10) Patent No.: US 11,539,061 B2
(45) Date of Patent: Dec. 27, 2022

(54) CELL FOR ELECTROCHEMICALLY DETERMINING ACTIVE SPECIES CONCENTRATIONS IN REDOX FLOW BATTERIES

(71) Applicant: United Technologies Corporation, Farmington, CT (US)

(72) Inventors: James D. Saraidaridis, Hartford, CT (US); Zhiwei Yang, South Windsor, CT (US)

(73) Assignee: RAYTHEON TECHNOLOGIES CORPORATION, Arlington, VA (US)

( * ) Notice: Subject to any disclaimer, the term of this patent is extended or adjusted under 35 U.S.C. 154(b) by 443 days.

(21) Appl. No.: 16/383,017

(22) Filed: Apr. 12, 2019

(65) Prior Publication Data

US 2020/0328435 A1 Oct. 15, 2020

(51) Int. Cl.
*H01M 8/04186* (2016.01)
*H01M 8/04082* (2016.01)
(Continued)

(52) U.S. Cl.
CPC ... *H01M 8/04194* (2013.01); *H01M 8/04201* (2013.01); *H01M 8/04477* (2013.01); *H01M 8/188* (2013.01); *Y02E 60/50* (2013.01)

(58) Field of Classification Search
CPC ......... H01M 8/04201; H01M 8/04194; H01M 8/04477; H01M 8/188; Y02E 60/50
(Continued)

(56) References Cited

U.S. PATENT DOCUMENTS 9,893,361 B1 * 2/2018 Jaker .................... H01M 4/622
2002/0112969 A1 8/2002 Hodges et al.
(Continued)

FOREIGN PATENT DOCUMENTS

WO 2015066398 5/2015

OTHER PUBLICATIONS

Kroner, I., Becker, M., and Turek, T. (2019). Monitoring the state of charge of the positive electrolyte in a vanadium redox-flow battery with a novel amperometric sensor. Batteries, 5(5) Jan. 5, 2019. pp. 1-11.

(Continued)

*Primary Examiner* — Jonathan G Jelsma
*Assistant Examiner* — Omar M Kekia
(74) *Attorney, Agent, or Firm* — Carlson, Gaskey & Olds, P.C.

(57) ABSTRACT

A redox flow battery system includes a redox flow battery that has a redox flow cell and a supply/storage system. The supply/storage system has first and second electrolytes for circulation through the redox flow cell. At least the first electrolyte is a liquid electrolyte that has electrochemically active species with multiple, reversible oxidation states. A secondary cell is operable to monitor concentration of one or more of the electrochemically active species. The secondary cell has a counter electrode, a flow passage that connects the counter electrode with the redox flow battery to receive the first or second electrolyte, a working electrode, and a separator. The working electrode is isolated from receiving the electrochemically active species of the first and second electrolytes except for a transport passage connecting the flow passage and the working electrode. The transport passage limits movement of the electrochemically active species to the working electrode.

18 Claims, 5 Drawing Sheets

(51) Int. Cl.
*H01M 8/0444* (2016.01)
*H01M 8/18* (2006.01)

(58) Field of Classification Search
USPC .......................................................... 429/81
See application file for complete search history.

(56) References Cited

U.S. PATENT DOCUMENTS

| | | | |
|---|---|---|---|
| 2015/0086896 A1* | 3/2015 | Chang ................. | H01M 8/0482 |
| | | | 324/432 |
| 2016/0293979 A1* | 10/2016 | King ..................... | H01M 8/222 |
| 2017/0059520 A1 | 3/2017 | Yang et al. | |
| 2018/0331383 A1* | 11/2018 | Wu ....................... | H01M 8/242 |
| 2019/0165384 A1* | 5/2019 | Naitou ................. | H01M 8/0234 |
| 2019/0237780 A1* | 8/2019 | Ikeuchi ............. | H01M 8/04753 |
| 2020/0161687 A1* | 5/2020 | Han ................. | H01M 8/04223 |

OTHER PUBLICATIONS

Tang, A., Aaron, D.S., Papandrew, A.B., and Zawodzinski, Jr., T.A. (2012). Monitoring the state of charge of operating vanadium redox flow batteries. ECS Transactions, 41 (23). pp. 1-9.
European Search Report for European Application No. 20163363.3 completed Aug. 26, 2020.

* cited by examiner

CELL FOR ELECTROCHEMICALLY DETERMINING ACTIVE SPECIES CONCENTRATIONS IN REDOX FLOW BATTERIES

BACKGROUND

Redox flow batteries ("RFB") are designed to convert electrical energy into chemical energy that can be stored and later released when there is demand. As an example, a RFB may be used with a renewable energy system, such as a wind-powered system, to store energy that exceeds consumer demand at some point in time and later release that energy when there is greater demand.

A typical RFB includes a redox flow cell that has a first or positive electrode and a second or negative electrode separated by an ion-conducting separator, such as an ion-exchange membrane. A first or positive fluid electrolyte (sometimes referred to as the posolyte) is delivered to the positive electrode and a second or negative fluid electrolyte (sometimes referred to as the negolyte) is delivered to the negative electrode to drive reversible redox reactions. Upon charging, the electrical energy supplied causes an electrochemical reduction reaction in one electrolyte and an electrochemical oxidation reaction in the other electrolyte. The separator prevents the electrolytes from freely and rapidly mixing but permits selected ions to pass through to balance the redox reactions. Upon discharge, the chemical energy contained in the liquid electrolytes is released in the reverse reactions and electrical energy can be drawn from the electrodes. RFBs are distinguished from other electrochemical energy storage devices by, inter alia, the use of externally-supplied, fluid electrolyte solutions that include reactants that participate in reversible electrochemical reactions.

SUMMARY

A redox flow battery system according to an example of the present disclosure includes a redox flow battery that has a redox flow cell and a supply/storage system external of the redox flow cell. The supply/storage system has first and second electrolytes for circulation through the redox flow cell. At least the first electrolyte is a liquid electrolyte that has electrochemically active species with multiple, reversible oxidation states. A secondary cell is operable to monitor concentration of one or more of the electrochemically active species. The secondary cell has a counter electrode, a flow passage that connects the counter electrode with the redox flow battery to receive the first or second electrolyte, at least one working electrode, and a separator between the counter electrode and the at least one working electrode. The at least one working electrode is isolated from receiving the electrochemically active species of the first and second electrolytes except for at least one transport passage connecting the flow passage and the at least one working electrode. The at least one transport passage limits movement of the electrochemically active species to the at least one working electrode.

In a further embodiment of any of the foregoing embodiments, the at least one transport passage comprises an opening through the separator.

In a further embodiment of any of the foregoing embodiments, the opening is straight.

In a further embodiment of any of the foregoing embodiments, the opening has a cross-sectional area that is equal to or less than 1 square millimeter.

In a further embodiment of any of the foregoing embodiments, the secondary cell further includes an ion exchange membrane adjacent the separator.

In a further embodiment of any of the foregoing embodiments, the at least one working electrode includes first and second working electrodes, and the at least one transport passage includes first and second openings through the separator.

In a further embodiment of any of the foregoing embodiments, the first and second openings are straight.

In a further embodiment of any of the foregoing embodiments, the first and second openings have a cross-sectional area that is equal to or less than 1 square millimeter.

In a further embodiment of any of the foregoing embodiments, the at least one transport passage comprises a bleed line from the flow passage.

In a further embodiment of any of the foregoing embodiments, the at least one transport passage comprises channels in the separator.

A further embodiment of any of the foregoing embodiments includes a vent passage connected with the at least one working electrode.

In a further embodiment of any of the foregoing embodiments, the at least one transport passage is selected from the group consisting of an opening through the separator, a bleed line from the flow passage, channels in the separator, and combinations thereof.

A redox flow battery system according to an example of the present disclosure includes a redox flow battery that has a redox flow cell and a supply/storage system external of the redox flow cell. The supply/storage system has first and second electrolytes for circulation through the redox flow cell. At least the first electrolyte is a liquid electrolyte has electrochemically active species with multiple, reversible oxidation states. A secondary cell is fluidly connected with the first electrolyte and is operable to monitor concentration of one or more of the electrochemically active species. The secondary cell has a counter electrode, a working microelectrode, and an ionically conductive path formed by the first electrolyte between the counter electrode and the working microelectrode.

In a further embodiment of any of the foregoing embodiments, the working microelectrode has an area A1 of less than 0.8 mm2.

In a further embodiment of any of the foregoing embodiments, the counter electrode has an area A2 that is equal to or greater than 0.8 mm2.

In a further embodiment of any of the foregoing embodiments, the area A2 is greater than the area A1 by a factor of at least 5.

A method for monitoring state of charge in a redox flow battery system according to an example of the present disclosure includes applying a bias voltage to the working electrode relative to the counter electrode, measuring electric current in an electrical circuit that connects the working electrode and the counter electrode to determine an electrochemical response from redox reactions of the electrochemically active species at the working electrode, determining a concentration of at least one of the electrochemically active species based on the electrochemical response, and determining a state of charge of the electrochemically active species based on the concentrations measured.

In a further embodiment of any of the foregoing embodiments, the bias voltage is a constant voltage.

In a further embodiment of any of the foregoing embodiments, the bias voltage varies dynamically as a function of an open cell voltage of the redox flow cell.

In a further embodiment of any of the foregoing embodiments, the bias voltage varies.

A secondary cell for use with a redox flow battery system according to an example of the present disclosure includes a counter electrode, a flow passage connected to the counter electrode to deliver a liquid electrolyte having electrochemically active species with multiple, reversible oxidation states, at least one working electrode, and a separator between the counter electrode and the at least one working electrode. The at least one working electrode is isolated from receiving the electrochemically active species of the liquid electrolyte except for at least one transport passage connecting the flow passage and the at least one working electrode. The at least one transport passage limits movement of the electrochemically active species to the at least one working electrode.

In a further embodiment of any of the foregoing embodiments, the at least one transport passage comprises an opening through the separator, wherein the opening is straight.

A further embodiment of any of the foregoing embodiments includes an ion exchange membrane adjacent the separator.

In a further embodiment of any of the foregoing embodiments, the at least one working electrode includes first and second working electrodes, and the at least one transport passage includes first and second openings through the separator. The first and second openings are straight.

In a further embodiment of any of the foregoing embodiments, the at least one transport passage comprises a bleed line from the flow passage.

In a further embodiment of any of the foregoing embodiments, the at least one transport passage comprises channels in the separator.

A further embodiment of any of the foregoing embodiments includes comprising a vent passage connected with the at least one working electrode.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
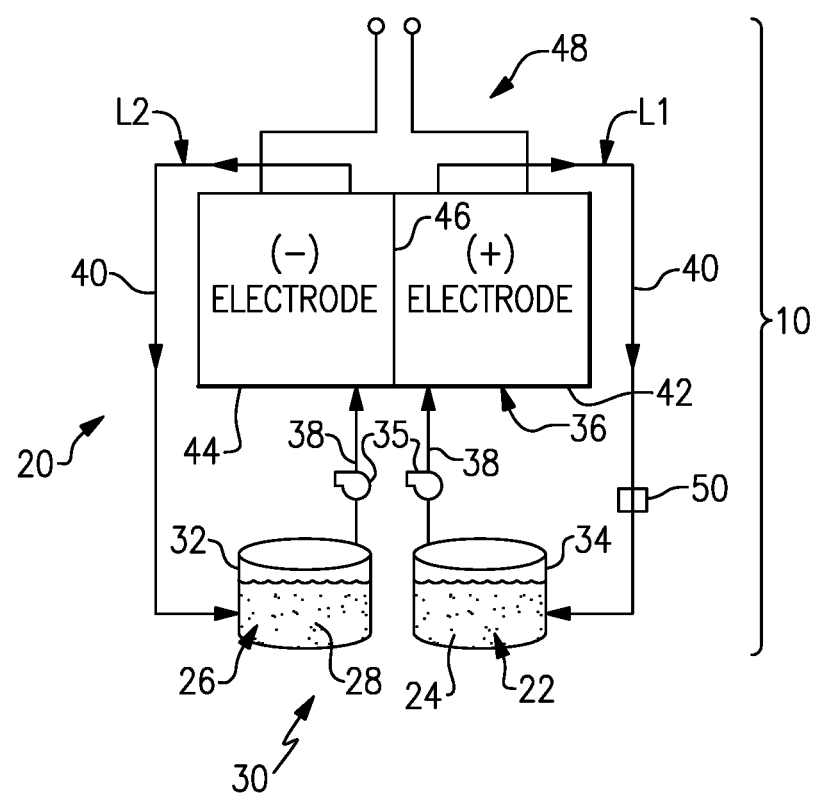
FIG. 1 illustrates an example redox flow battery system.

FIG. 1 schematically shows portions of an example system 10 that includes a redox flow battery 20 ("RFB 20") for selectively storing and discharging electrical energy. As an example, the RFB 20 can be used to convert electrical energy generated in a renewable energy system to chemical energy that is stored until a later time when there is greater demand, at which time the RFB 20 can be used to convert the chemical energy back into electrical energy. The flow battery 20 can supply the electric energy to an electric grid, for example.

The RFB 20 includes a first electrolyte 22 that has at least one electrochemically active species 24 that functions in a redox pair with regard to a second electrolyte 26 that has at least one electrochemically active species 28. As will be appreciated, the terminology "first" and "second" is to differentiate that there are two architecturally distinct electrolytes. It is to be further understood that terms "first" and "second" are interchangeable in that the first electrolyte 22 could alternatively be termed as the second electrolyte, and vice versa, or even the same electrolyte, but housed in the opposing tank and reactor volume.

At least the first electrolyte is a liquid, but the second electrolyte is typically also a liquid. For example, the electrochemically active species 24, 28 can be based on vanadium or iron. The electrochemically active species 24, 28 can include ions of elements that have multiple, reversible oxidation states in a selected liquid solution, such as but not limited to, aqueous solutions or dilute aqueous acids, such as 1-5M sulfuric acid. In some examples, the multiple oxidation states are non-zero oxidation states, such as for transition metals including but not limited to vanadium, iron, manganese, chromium, zinc, molybdenum and combinations thereof, and other elements including but not limited to sulfur, cerium, lead, tin, titanium, germanium and combinations thereof. In some examples, the multiple oxidation states can include the zero oxidation state if the element is readily soluble in the selected liquid solution in the zero oxidation state. Such elements can include the halogens, such as bromine, chlorine, and combinations thereof. The electrochemically active species 24, 28 could also be organic molecules or macromolecules that contain groups that undergo electrochemically reversible reactions, such as quinones or nitrogen-containing organics such as quinoxalines or pyrazines. In embodiments, the electrolytes 22 and 26 are solutions that include one or more of the electrochemically active species 24, 28. The first electrolyte 22 (e.g., the positive electrolyte) and the second electrolyte 26 (e.g., the negative electrolyte) are contained in a supply/storage system 30 that includes first and second vessels 32, 34.

In one example based on aqueous vanadium electrolyte chemistry with equimolar electrolytes 22, 26, the electrolytes together have an average oxidation state of +3.5 based upon the use of $V^{2+}/V^{3+}$ and $V^{4+}/V^{5+}$ (which can also be denoted as V(ii)/V(iii) and V(iv)/V(v), although the charge of the vanadium species with oxidation states of 4 and 5 are not necessarily +4 and +5) as the electrochemically active species 24, 28. For example, if the electrolyte solution is aqueous sulfuric acid, then the V(iv)/V(v) species of the first electrolyte 22 will be present as $VO^{2+}$ and $VO_{2+}$ and the V(ii)/V(iii) species of the second electrolyte will be present as and $V^{2+}$ and $V^{3+}$ ions.

The electrolytes 22, 26 are circulated by pumps 35 to at least one redox flow cell 36 of the flow battery 20 through respective feed lines 38, and are returned from the cell 36 to the vessels 32, 34 via return lines 40. As can be appreciated, additional pumps 35 can be used if needed, as well as valves (not shown) at the inlets/outlets of the components of the RFB 20 to control flow. In this example, the feed lines 38 and the return lines 40 connect the vessels 32, 34 in respective loops L1, L2 with first and second electrodes 42, 44. Multiple cells 36 can be provided as a stack within the loops L1, L2.

The cell or cells 36 each include the first electrode 42, the second electrode 44 spaced apart from the first electrode 42, and an electrolyte separator layer 46 arranged between the first electrode 42 and the second electrode 44. For example, the electrodes 42, 44 are porous electrically-conductive structures, such as carbon paper or felt. The electrodes 42, 44 may also contain additional materials which are catalytically-active, for example a metal oxide. In general, the cell or cells 36 can include bipolar plates, manifolds and the like for delivering the electrolytes 22, 26 through flow field channels to the electrodes 42, 44. It is to be understood, however, that other configurations can be used. For example, the cell or cells 36 can alternatively be configured for flow-through operation where the fluid electrolytes 22, 26 are pumped directly into the electrodes 42, 44 without the use of flow field channels.

The electrolyte separator layer 46 can be, but is not limited to, an ionic-exchange membrane, a micro-porous polymer membrane or an electrically insulating microporous matrix of a material, such as silicon carbide (SiC), that prevents the fluid electrolytes 22, 26 from freely and rapidly mixing but permits selected ions to pass through to complete the redox reactions while electrically isolating the electrodes 42, 44. In this regard, the loops L1, L2 are isolated from each other during normal operation, such as charge, discharge and shutdown states.

The fluid electrolytes 22, 26 are delivered to, and circulate through, the cell or cells 36 during an active charge/discharge mode to either convert electrical energy into chemical energy or, in the reverse reaction, convert chemical energy into electrical energy that is discharged. The electrical energy is transmitted to and from the cell or cells 36 through an electric circuit 48 that is electrically coupled with the electrodes 42, 44.

RFBs in general are known to be susceptible to capacity losses for various reasons. One such reason relates to the concentration of the electrochemically active species in the electrolytes. Using a vanadium system as an example, vanadium ions may undesirably pass through the separator membrane or precipitate as solids that are unable to participate in the electrochemical reaction. Over time, such mechanisms may result in a total vanadium amount in one side that is larger than in the other side, leading to the decrease in the capacity of an individual electrolyte, and therefore the whole system, to store and discharge electrical energy. Measures are known for addressing at least some of these mechanisms to restore the capacity of the electrolytes. However, in order to employ these measures, and do so effectively and only when necessary, the vanadium concentrations must first be determined.

Sources of capacity loss can be diagnosed by monitoring a state-of-charge ("SOC") of the electrochemically active species in the electrolytes. For example, in an aqueous vanadium electrolyte using the $V^{4+/5+}$ and $V^{2+/3+}$ couples in electrolytes 22, 26 the SOC of the electrolytes can be expressed in terms of the concentrations of the electrochemically active species as follows:

$$SOC_{posolyte} = \frac{[VO_2^+]}{[VO^{2+}] + [VO_2^+]}$$

-continued
$$SOC_{negolyte} = \frac{[V^{2+}]}{[V^{2+}] + [V^{3+}]}$$

In such a system starting with equimolar electrolytes, a deviation between the negolyte SOC and posolyte SOC indicates an imbalance in the vanadium quantities between the two electrolytes and/or change in average oxidation state from V3.5+, among other possible forms of capacity loss. For example, once the deviation reaches a preset threshold, measures may be taken to restore the capacity of the electrolytes, i.e., transferring certain amount of vanadium from one side to the other side. As will be appreciated, the SOC may be similarly determined for other types of active species.

Various methods are also known for monitoring reactant concentrations and/or SOC. For example, observation of the open circuit voltage ("OCV") can be used as an indirect indication of SOC. However, OCV only serves as an average SOC of the system and is not indicative of the individual state of the two half cells since it only observes the complete battery. Optical UV-visible light spectroscopy can also be used to monitor vanadium concentrations and therefore SOC, particularly of the negative half-cell in aqueous vanadium chemistries. Such optical methods, however, can require complex, expensive equipment. Furthermore, monitoring vanadium concentrations, and therefore SOC, in the positive electrolyte can require extensive empirical calibration procedures. As will now be described, the system 10 includes a relatively simple secondary cell 50, which will be referred to herein as electrochemically-determined SOC cell ("EC-SOC") 50. The EC-SOC 50 is operable to monitor active species concentrations, and in turn, the SOC of posolyte and/or negolyte.

In the illustrated example, the EC-SOC 50 is fluidly connected with the RFB 20 and is located in the return line 40 from the positive electrode 42. It is to be appreciated that the EC-SOC 50 could alternatively be located on the return line 40 from the negative electrode 44, in either of the feed lines 38, or in either of the reservoirs 32, 34. In further examples, the EC-SOC 50 may be in fluid connection with the RFB 20 through a bleed line at any of the above locations. The system 10 may further include one or more additional EC-SOCs 50 at one or more of the above locations. For example, the system 10 may include one EC-SOC 50 in fluid connection with the first electrolyte 22 and another EC-SOC 50 in fluid connection with the second electrolyte 26.

As will be described and demonstrated in the examples below, the EC-SOC 50 may have various configurations, all of which are based on limiting transport of active species transport to a working electrode. For example, limiting transport of active species can be accomplished via flow limitations, molecular diffusion limitations, or combinations of a variety of different mechanisms of transport limitations. The oxidation or reduction reaction rate of the electrochemically active species 24, 28 in the EC-SOC 50 is thus limited by the target species that are accessible to the working electrode, which is proportional to the concentration of that target species in the electrolyte. Accordingly, the observed or measured electric current of the EC-SOC 50 is proportional to the target species concentration in the electrolyte. In this manner, the observed or measured electric current of the EC-SOC 50 can be used to determine the target species concentrations in the electrolyte and thus the SOC. For example, observed or measured electric currents can be collected experimentally over a range of concentrations of interest for one or more target species and then used as a lookup table to correlate observed or measured currents in practice to concentrations of the target species.

Figure 2:
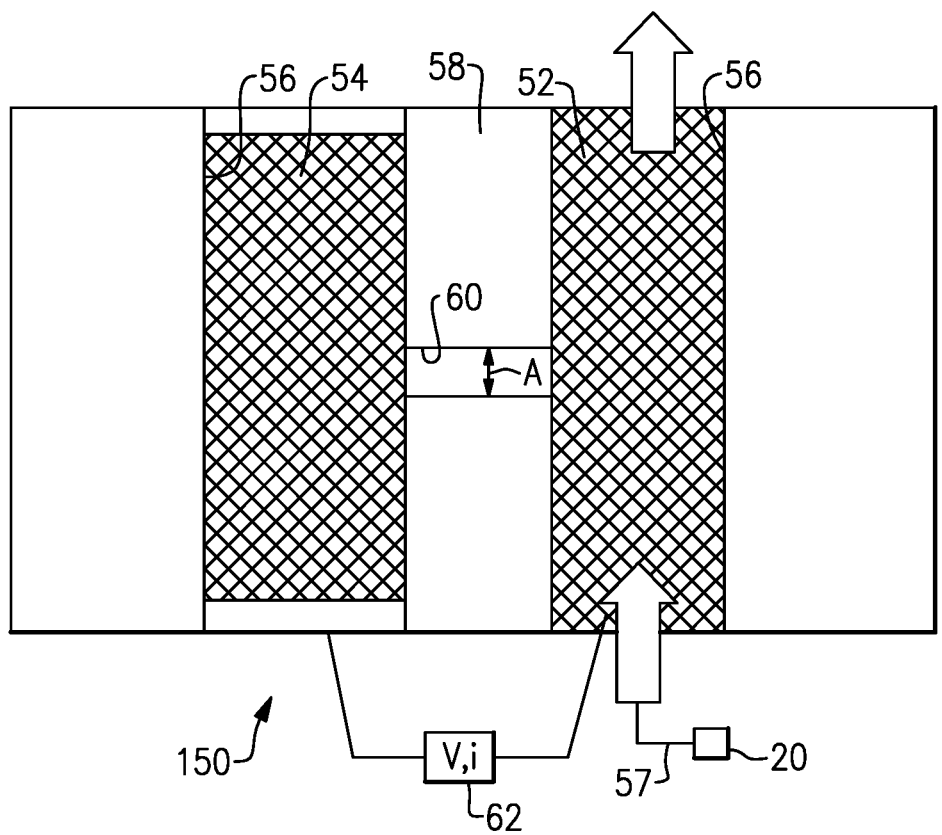
FIG. 2 illustrates an example electrochemical cell for use in the system of FIG. 1.

As demonstrated in the following non-limiting examples, limiting transport of the active species at the working electrode can be implemented in either of two approaches, namely by using a reactant-limiting transport path to a working electrode or by using a diffusion-limited working microelectrode. FIG. 2 illustrates an EC-SOC 150 that implements active species transport limitations by employing the first approach. In this disclosure, like reference numerals designate like elements where appropriate and reference numerals with the addition of one-hundred or multiples thereof designate modified elements that are understood to incorporate the same features and benefits of the corresponding elements.

The EC-SOC 150 includes a counter electrode 52 and a working electrode 54. The counter electrode 52 is fluidly connected with the RFB 20, which is represented schematically in FIG. 2, to receive electrolyte therefrom (either the first or second electrolytes 22, 26). For example, the electrodes 52 and 54 are carbon paper or other material capable of catalyzing the reversible redox reactions.

In this example, flow fields 56 are provided adjacent each of the electrodes 52, 54. The flow fields 56 may be plates that contain channels for distributing electrolyte to the electrodes 52, 54. As an example, the channels may have an interdigitated configuration, but may alternatively be of serpentine configuration, straight, open-ended configuration, or flow-through configuration without the use of flow field channels. The flow fields 56 may have different configurations. The plates may also serve to provide mechanical support to hold the electrodes 52, 54 and separator 58 together.

The counter electrode 52 is fluidly connected with the RFB 20 by a flow passage 57 to receive/return flow of electrolyte 22 or 26 from/to the RFB 20. The flow passage 57 may include a pipe, tube, and/or the like, as well as the flow field 56 adjacent the counter electrode 52. For example, the flow of the electrolyte to the counter electrode 52 depends on the operation of the pump 35. The flow field 56 adjacent the working electrode 54, on the other hand, is a stagnant flow field that is isolated from receiving free flow of electrolyte 22 or 26. That is, the presence of electrolyte in the flow field 56 adjacent the working electrode 54 does not directly rely on operation of the pump 35.

The EC-SOC 150 further includes a separator 58 between the working electrode 54 and the counter electrode 52. For example, the separator 58 is impermeable and may be a polymer film, sheet, or wall that is electrically insulating. The separator 58 in this example is impermeable to the electrolytes 22, 26, including the active species 24, 28 and the carrier liquid (e.g., water, acid, non-aqueous solvents, etc.).

The working electrode 54 is isolated from receiving free flow of electrolyte 22 or 26, including the electrochemically active species 24, 28, except for one or more transport passages that connect the flow passage 57 and the working electrode 54. The transport passage limits movement of the active species 24, 28 to the working electrode 54. In the example shown in FIG. 2, the transport passage is a diffusion opening 60 that extends through the separator 58. The opening 60 opens on one end to the counter electrode 52 and on its opposite end to the working electrode 54. The opening 60 connects the opposed sides of the separator 58 and provides an exclusive transport path for electrolyte 22 or 26 to the working electrode 54. For instance, since the flow field 56 adjacent the working electrode 54 is a stagnant flow field, with no inlet or outlet, the exclusive access to electrolyte 22 or 26 is via the opening 60. That is, the working electrode 54 is otherwise isolated from the electrolyte 22 and 26 but for the opening 60.

The opening 60 is sized to limit transport of the electrolyte 22, 26 there through. For instance, the opening 60 is sized to prevent free flow of electrolyte 22, 26 and limit transport to diffusion movement of the electrolyte 22, 26, namely diffusion of the active species 24, 28. In one example, the opening 60 is of uniform cross-section over its length and spans straight across the separator 58 perpendicular to the plane defined by the faces of the separator 58. In one additional example, the opening 60 has a cross-sectional area, represented at A, which is 1 square millimeter or less.

In operation of the EC-SOC 150 to monitor a reactant concentration, electrolyte 22 or 26 flows through the flow field 56 adjacent the counter electrode 52. A voltage, as represented at 62, is applied between the working electrodes 54 and the counter electrode 52. The active species in 24 or 28 diffuses through the opening 60 to the working electrode 54. The rate of diffusion of the active species through the opening 60 is proportional to the concentration of the active species in the electrolyte 22 or 26 in the flow field 56 adjacent the counter electrode 52. With the bias voltage applied between the working electrode 54 and the counter electrode 52, the target active specie reacts at the working electrode 54 to generate an electric current. At a certain bias voltage, the reaction becomes limited by the amount of the target active specie at the working electrode 54, which depends on the diffusion rate through the opening 60 and is proportional to the active species concentration in the flow field 56 adjacent the counter electrode 52. Any further increase in the bias voltage will not increase the reaction rate, so any bias beyond this value can be used for operation of the EC-SOC 150. The magnitude of the electric current response is proportional to the target active specie amount in the working electrode 56. The electric current response can thus be used to monitor the target active specie concentrations in the electrolyte 22 or 26. The EC-SOC 150 may be used to monitor the reduced and/or oxidized forms of the active species 24, 28 in the respective electrolytes 22, 26, and therefore, the SOC can be determined. Moreover, as will be discussed in further detail below, alternate control and response methodologies may also be used. Once the target active species react, the reacted species diffuse back through the opening 60 into the flow field 56 adjacent the counter electrode 52.

The control and response methodology may be either a fixed EC-SOC potential approach or dynamic EC-SOC potential approach. In a fixed EC-SOC potential approach, the voltage applied between the counter electrode 52 and the working electrode 54 is held constant while the responsive electric current is observed. For instance, a constant voltage may be applied by electrically connecting the electrodes 52, 54 with a battery or other fixed-voltage device. In this approach the working electrode potential (vs. reversible hydrogen electrode, "RHE") varies as electrolyte SOC varies. In a dynamic EC-SOC potential approach, the voltage applied between the working electrode 54 and the counter electrode 52 is varied dynamically as a function of the flow battery OCV measurements, collected from a separate cell. The dynamic EC-SOC potential approach may be implemented via a voltage control system in which a computerized controller receives signals representative of the OCV and determines the level of voltage to apply based on the OCV. The determination of the level of voltage may be provided by a lookup table or algorithm function. In some examples, the voltage is varied according to a voltage pattern. For instance, the voltage pattern may be square, triangle, or sinusoidal wave-form patterns.

Table 1 and Table 2 below demonstrate examples of each approach for various exemplary electrolyte SOCs for different active species 24, 28 in an aqueous vanadium RFB system. For instance, the fourth column in Table 1 depicts the fixed EC-SOC potential approach in which the working electrode potential (vs. RHE) varies as the posolyte SOC varies when the bias voltage between the working electrode 54 and counter electrode 52 is held at 0.25V, and the fifth column depicts the dynamic EC-SOC potential approach in which the voltage between the working electrode 54 and the counter electrode 52 is a function of the flow battery OCV measurement multiplied by a factor of −0.55 plus 1.00 V, giving the working electrode potential (vs. RHE) a constant 1.3 V in the posolyte SOC range. One potential advantage of using the dynamic potential approach is to prevent the working electrode 54 from reaching a potential (vs. RHE) where significant side reactions occur, such as carbon corrosion during the $V^{4+}$ measurement or hydrogen evolution during the $V^{3+}$ measurement.

The vent passage 64 may facilitate avoiding the buildup of pressure from any reaction byproducts in the working electrode 54 that may artificially hinder transport through the separator 58. It is to be appreciated that the vent passage 64 may also be used with the separator 158 or in any of the other examples herein. Additionally, the vent passage 64 may serve as a return line to return electrolyte from the working electrode 54 to the flow passage 57 or RFB 20.

In a further example, the opening 60 is sized to limit transport of the active species 24, 28 to the working electrode 54 such that a molar flux of the active species 24, 28 to the working electrode is less than 100% of the stoichiometric flow rate equivalent to the maximum current permitted by the conduction path available through the separator 58 or 158 (impermeable or permeable) and the bias applied. For example if the separator 58 or 158 has an effective area specific resistance ("ASR") of 1 ohm-$cm^2$ and the bias applied is 0.3 V, then molar flux should not exceed a transport rate capable of delivering 0.3 A-$cm^2$, or less than 3.1 umol/s/$cm^2$ for a 1-electron reaction. This limitation ensures a reactant-transport-limited current measurement in a system using forced convection of the electrolytes 22 or 26. For example, the electrolyte flow rate through the working electrode 54 may be less than 25% of the flow rate into the counter electrode 52, and in further examples may be 1.0% to 0.01% to avoid large power draw. Additionally, the flow rate in the counter electrode 52 can be selected such that the pressure difference between the counter electrode 52 and the working electrode 54, and therefore, flow rate of the electrolyte through the opening 60 remain relatively constant during operation (within 20% of average flow rate measured across a charge-discharge cycle).

Figure 4:
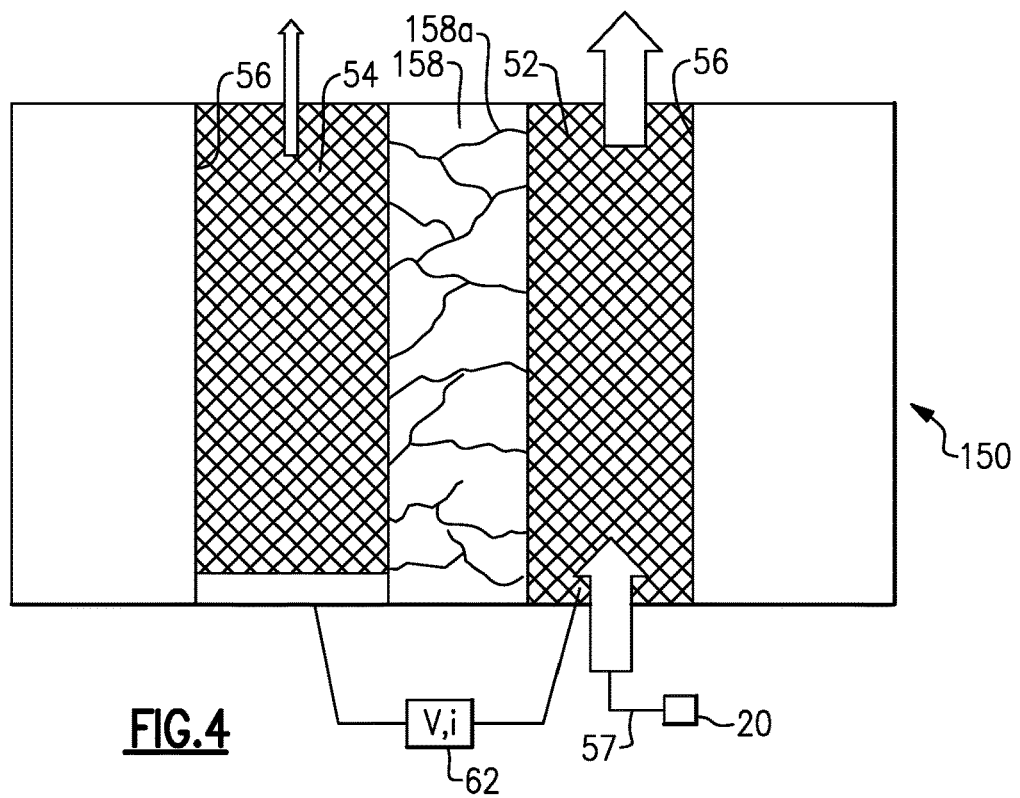
FIG. 4 illustrates another example electrochemical cell includes a permeable separator that can allow a convective transport path.

In another example illustrated in FIG. 4, the transport passage for limiting movement comprises channels 158a in the separator 158. The channels 158a are permeable to the electrolytes 22, 26, including the active species 24, 28 and the carrier liquid. In this context the term permeable refers to separators with water permeability greater than $10^{−18}$ $cm^2$.

TABLE 1

Bias voltage between working electrode and counter electrode for $V^{4+}$ measurement

| Posolyte SOC | Posolyte potential vs. RHE | OCV of flow battery cell | W.E. potential (vs. RHE) w/fixed 0.25 V between W.E. and C.E. | W.E. (vs. C.E.) W.E. = −0.55 * OCV + 1.00 V, to keep W.E. constant at 1.30 V vs. RHE |
|---|---|---|---|---|
| Low SOC (~5%) | 0.97 V | 1.13 V | 1.23 V vs. RHE | |
| 20% | 1.02 V | 1.3 V | 1.27 V vs. RHE | 0.28 V |
| 50% | 1.07 V | 1.4 V | 1.32 V vs. RHE | 0.23 V |
| 80% | 1.13 V | 1.5 V | 1.38 V vs. RHE | 0.17 V |
| High SOC (~95%) | 1.20 V | 1.62 V | 1.45 V vs RHE | |

TABLE 2

Bias voltage between working electrode and counter electrode for $V^{3+}$ measurement

| Negolyte SOC | Negolyte potential vs. RHE | OCV of the flow battery cell | W.E. potential (vs. RHE) w/fixed −0.25 V between W.E. and C.E. | W.E. (vs. C.E.) W.E. = 0.45 * OCV −0.80 V, to keep W.E. constant at −0.50 V vs. RHE |
|---|---|---|---|---|
| Low SOC (~5%) | −0.21 V | 1.18 V | −0.46 | |
| 20% | −0.28 V | 1.30 V | −0.53 | −0.215 |
| 50% | −0.33 V | 1.40 V | −0.58 | −0.170 |
| 80% | −0.37 V | 1.50 V | −0.62 | −0.125 |
| High SOC (~95%) | −0.42 V | 1.62 V | −0.67 | |

Figure 3:
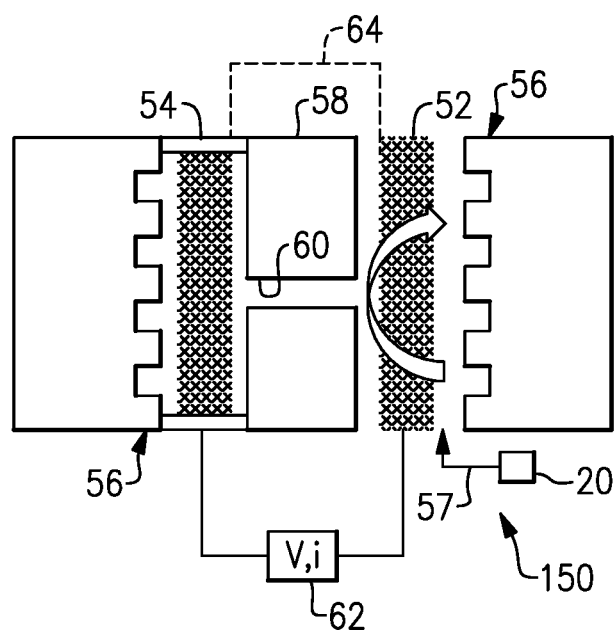
FIG. 3 illustrates another example electrochemical cell that that includes a vent passage.

FIG. 3 illustrates a modified example of the EC-SOC 150. The reaction at the working electrode 54 may generate gaseous byproducts, such as carbon dioxide and/or hydrogen. Since the flow field 56 and working electrode 54 are isolated except for the opening 60, such gaseous byproducts may build-up. In this regard, this modified version of the EC-SOC 150 includes a vent passage 64 that connects the the flow field 56 adjacent the working electrode 54 and the outlet of the flow field 56 adjacent the counter electrode 52 (as shown in FIG. 3). Additionally or alternatively, the vent passage 64 may connect the flow field 56 adjacent the working electrode 54 to one of the first or second vessels 32, 34. For instance, the vent passage 64 may be a tube or pipe.

For example, the separator 158 is an ion exchange membrane (e.g., a perfluoro-sulfonic acid membrane) or microporous film e.g., a micro-porous polytetrafluoroethylene film or micro-porous polyethylene film). The separator 158 may also have zero, one, or more than one openings 60 as described above. The separator 158 no longer prevents forced convection of electrolyte 22, 26 and/or limits transport to only diffusion of the active species 24, 28, from the counter electrode 52 into the working electrode 54. Consequently, in this example, the flow rates fed to counter electrode 52 must be controlled to limit the flow rate to provide a molar flux less than 100% of the stoichiometric flow rate equivalent to the maximum current permitted by the conduction path available through the separator 58 or 158 (permeable or impermeable) and the bias applied as described earlier.

Example: An EC-SOC is configured as shown in FIG. 3 and includes of a Nafion-212 membrane as the separator 58 sandwiched between two pieces of 24-cm² thermally activated carbon paper as the working electrode 54 and the counter electrode 52, respectively. A 0.381 mm² hole in the center of the Nafion-212 membrane serves as the opening 60. The flow field 56 is provided as a graphitized plate adjacent the counter electrode 52 and has interdigitated flow-field channels. The sample posolyte is a 1.6 M vanadium solution and is circulated through the counter electrode 52 at a flow rate of 100 cc/min. There is no flow field adjacent the working electrode 52 and the working electrode 52 is connected to the sample posolyte reservoir by the vent passage 64. A constant bias voltage 0.3V (−0.3V) is applied between the working electrode 54 and the counter electrode 52 and the cell shows rapid current response, in a few seconds, to the change of the sample posolyte SOC. The cell current response exhibits an excellent linear relationship with the posolyte SOC, providing accurate measurement of the $V^4+$ concentration and the $V^5+$ concentration in the sample posolyte.

Figure 5:
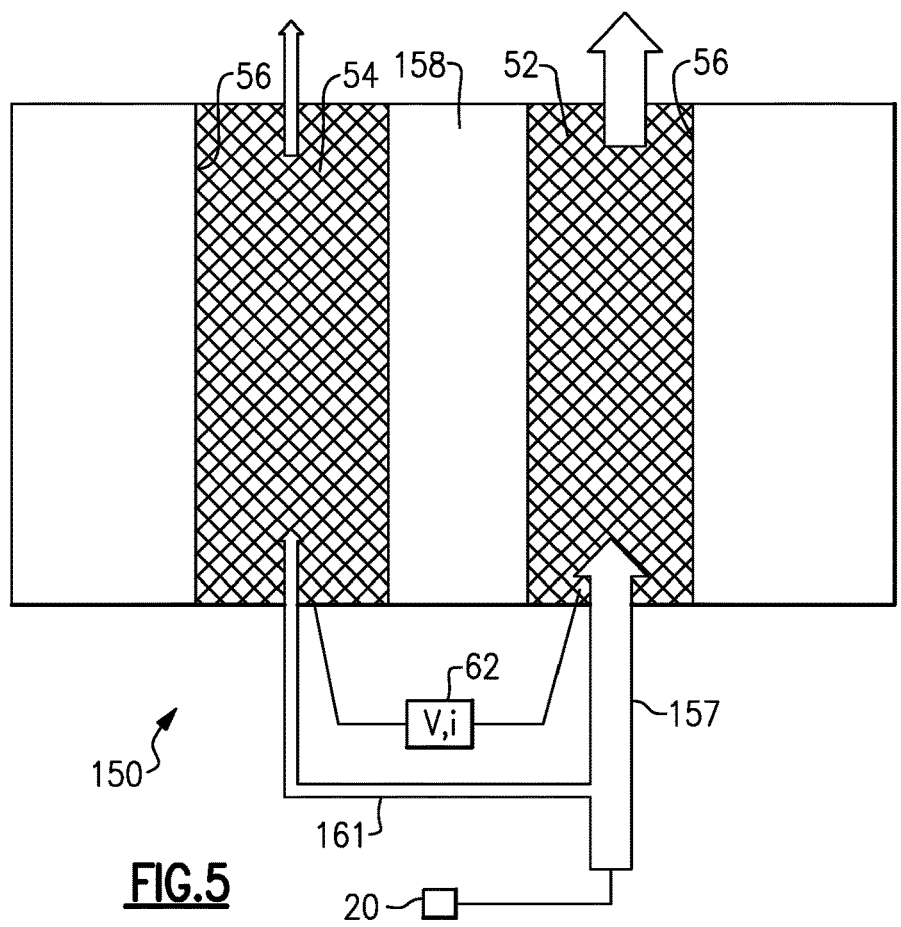
FIG. 5 illustrates another example electrochemical cell in which the flow passage to the counter electrode splits to a bleed line that leads to the working electrode.

In another example modification shown in FIG. 5, the transport passage comprises a bleed line 161. The bleed line 161 splits off from the flow passage 157 to the counter electrode 52 such that a portion of the electrolyte is diverted into the working electrode 54. The portion of the electrolyte diverted to the bleed line 161 is less than 50% of the total flow through the flow passage 157. For instance, the amount diverted into the bleed line 161 can be controlled by using a bleed line 161 with a higher hydraulic resistance than for the flow passage 157. The flow must also be limited to provide a molar flux of less than 100% of the stoichiometric flow rate equivalent to the maximum current permitted by the conduction path available through the permeable separator 158 and the bias applied. For example if the separator 158 has an effective ASR of 1 ohm-cm² and the bias applied is 0.3 V, then molar flux should not exceed a transport rate capable of delivering 0.3 A-cm², or less than 3.1 umol/s/cm² for a 1-electron reaction. This limitation ensures a reactant-transport-limited current measurement in a system using forced convection of the electrolytes 22 or 26. The electrolyte flow rate through the working electrode 54 may be less than 50% of the total flow, and in further examples is preferred to be 1.0% to 0.01% of the total flow.

Figure 6:
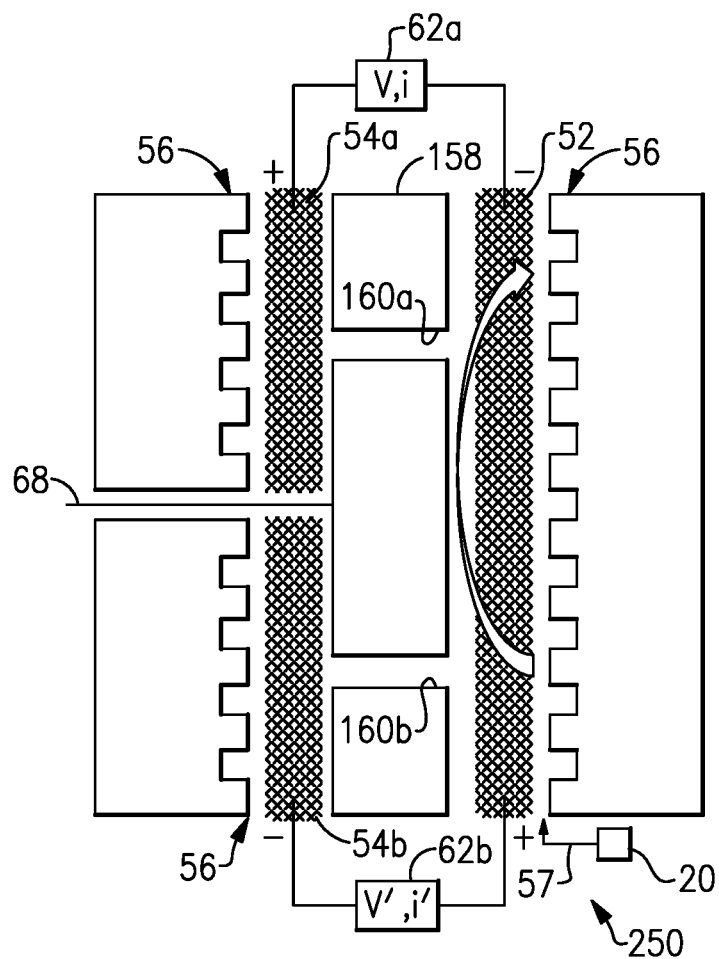
FIG. 6 illustrates an example dual configuration electrochemical cell.

FIG. 6 illustrates another example EC-SOC 250, which is a dual configuration for determining concentrations of two active species in 24 or 28 (e.g., $VO^{2+}$ and $VO_2^+$ ions in posolyte, or $V^{2+}$ and $V^{3+}$ ions in negolyte). In this regard, the EC-SOC 250 includes first and second working electrodes 54a, 54b. The working electrodes 54a, 54b are isolated by an electrically isolating separator 68. The separator 158 of the EC-SOC 250 in this example includes first and second openings 160a and 160b, which each are similar to and function as the opening 60 described above. The first opening 160a opens to the first working electrode 56a, and the second opening 160b opens to the second working electrode 56a. EC-SOC 250 may also include vents for both, one, or neither working electrode(s) 54a, 54b.

A first voltage 62a is applied between the first working electrode 54a and the counter electrode 52, and a second voltage 62b is applied between the second working electrode 54b and the counter electrode 52. For instance, one of the voltages 62a, 62b is positive and the other of the voltages 62a, 62b is negative, in order to oxidize and reduce the target redox pair of active species in 24 or 28, at each of the working electrodes 54a, 54b. As an example, $VO^{2+}$ ions are oxidized at the first working electrode 54a and $VO_{2+}$ ions are reduced at the second working electrode 54b, or $V^{2+}$ ions are oxidized at the first working electrode 54a and $V^{3+}$ are reduced at the second working electrode 54b. The electric current response can then be observed for each working electrode 54a, 54b to determine active specie concentration.

Figure 7:
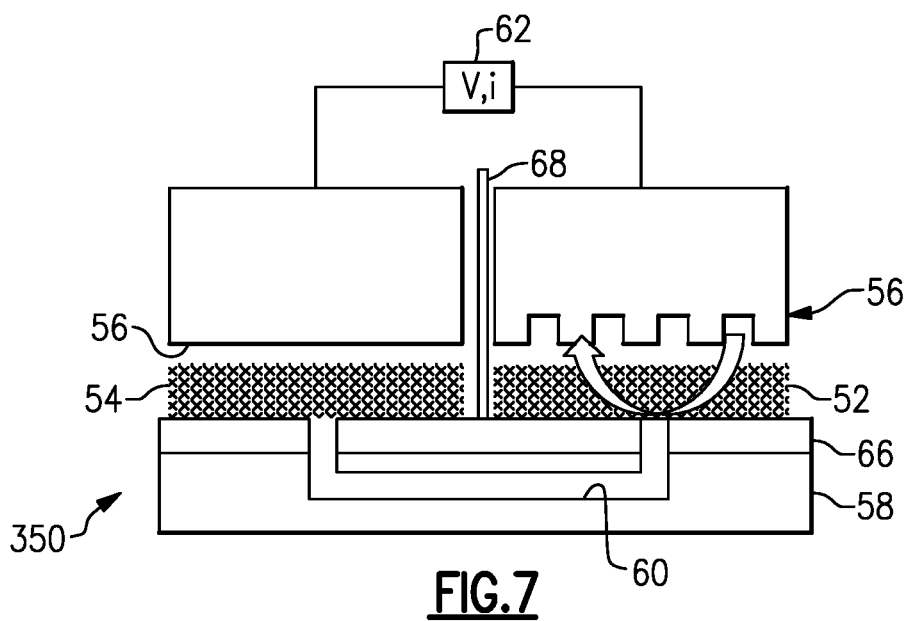
FIG. 7 illustrates an example planar electrochemical cell.

FIG. 7 illustrates another example EC-SOC 350. The EC cell 350 has a planar configuration in which the counter electrode 52 and the working electrode 54 are co-planar.

Figure 8:
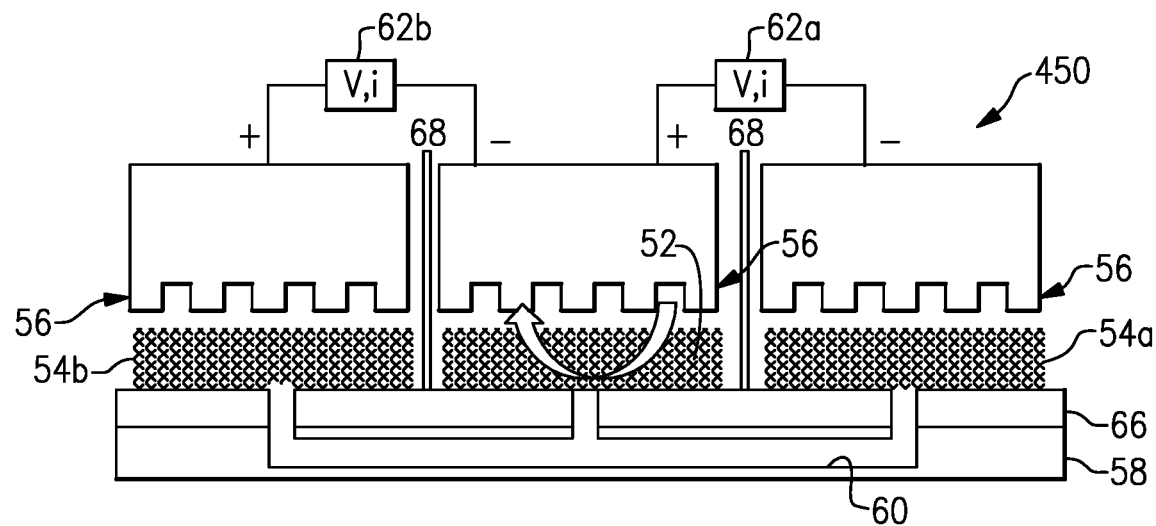
FIG. 8 illustrates an example dual configuration planar electrochemical cell.

FIG. 8 illustrates another example EC-SOC 450. The EC-SOC 450 has a planar, dual configuration in which the counter electrode 52 and the first and second working electrodes 54a, 54b are co-planar.

Figure 9:
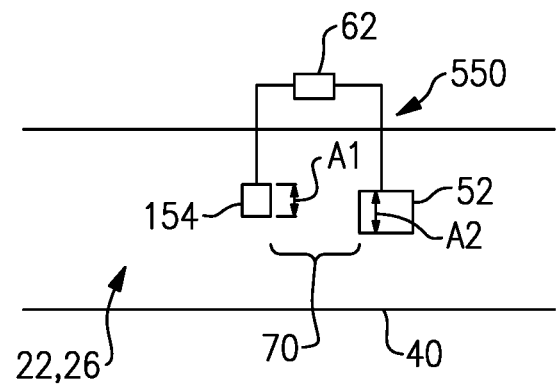
FIG. 9 illustrates a microelectrode based electrochemical cell.

FIG. 9 illustrates an EC-SOC 550 that employs a diffusion-limited microelectrode approach. The EC-SOC 550 illustrated here is deployed in the feed lines 38, but may alternatively or additionally be deployed in the locations described earlier herein. In this example, the EC-SOC 550 includes a counter electrode 52, a diffusion-limited working microelectrode 154, and an ionic ally conductive path 70 formed by the electrolyte between the electrodes 52, 154. The ionically conductive path 70 needs to have a resistance lower than a certain value as determined by the applied voltage, active species properties, and electrode parameters including: n, the number of electrons in the reaction, D, the diffusion coefficient of the active specie in the electrolytic solution, C, the concentration of the active specie in solution, A, the area of the electrode, and F, Faraday's constant. As used herein, a microelectrode refers to an electrode that has an area that is equal to or less than 0.8 mm². In this regard, the working electrode 154 has an area, represented at A1, that is less than or equal to 0.8 mm². The counter electrode 52 also has an area, represented at A2, which is equal to or greater than area A1. For instance, the area A2 is greater than A1 by a factor of at least 5.

$$R < \frac{V}{nFDC\sqrt{\frac{A}{\pi}}}$$

The working electrode 154 and the counter electrode 52 can be made from, but not only, carbonaceous, metallic, and composite materials. Carbonaceous electrodes include, but are not limited to glassy carbon or carbon fiber based electrodes. Metallic electrodes can include, but are not limited to gold, platinum, palladium, silver. Composite electrodes can include, but are not limited to, carbon resin composites, silicon-metal compounds or composites.

The example in FIG. 9 shows the working microelectrode 154 and the counter electrode 52 arranged in a planar configuration, but these can be placed in any orientation to achieve a prescribed resistance. Resistance that is too high will result in reaction of less than all of the active species that diffuse to the microelectrode 154, and therefore will not provide a reliable concentration measurement for the active specie in the electrolytic solution. In practice, the resistance should be small to avoid errant measurements caused by transient changes in resistivity of the electrolytic solution.

The area A1 of the working electrode 154 serves as the diffusion-limiting factor for the reaction of the active species in 24 or 28 at the working electrode 154. Thus, similar to the prior examples, the reaction at the working electrode 154 depends on and is proportional to the concentration of the target active species in 24 or 28. The generated electric current can thus be used to determine each active specie concentration and, in turn, the SOC in a similar manner as described above.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A redox flow battery system comprising:
    a redox flow battery including
        a redox flow cell, and
        a supply/storage system external of the redox flow cell, the supply/storage system including first and second electrolytes for circulation through the redox flow cell, at least the first electrolyte being a liquid electrolyte having electrochemically active species with multiple, reversible oxidation states; and
    a secondary cell operable to monitor concentration of one or more of the electrochemically active species, the secondary cell including a counter electrode, a flow passage connecting the counter electrode with the redox flow battery to receive the first or second electrolyte, at least one working electrode, and a separator between the counter electrode and the at least one working electrode, the separator being impermeable to the first and second electrolytes and the electrochemically active species, the at least one working electrode being isolated from receiving the electrochemically active species of the first and second electrolytes except for at least one transport passage that comprises an opening through the separator connecting the flow passage and the at least one working electrode, the opening having a first end that opens to the working electrode and a second end that opens to the counter electrode, the opening limiting movement of the electrochemically active species to the at least one working electrode.

2. The system as recited in claim 1, wherein the opening is straight.

3. The system as recited in claim 2, wherein the opening has a cross-sectional area that is equal to or less than 1 square millimeter.

4. The system as recited in claim 1, wherein the secondary cell further includes an ion exchange membrane adjacent the separator.

5. The system as recited in claim 1, wherein the at least one working electrode includes first and second working electrodes, and the at least one transport passage includes an additional opening through the separator.

6. The system as recited in claim 5, wherein the opening and the additional opening are both straight.

7. The system as recited in claim 6, wherein the opening and the additional opening have a cross-sectional area that is equal to or less than 1 square millimeter.

8. The system as recited in claim 1, wherein the at least one transport passage comprises a bleed line from the flow passage.

9. The system as recited in claim 1, wherein the at least one transport passage comprises channels in the separator.

10. The system as recited in claim 1, further comprising a vent passage connected with the at least one working electrode.

11. The system as recited in claim 1, wherein the flow passage circulates one of the first or second electrolytes through a flow field of the counter electrode, and the working electrode has a stagnant flow field that is connected to the flow field via the opening.

12. A secondary cell for use with a redox flow battery system, the cell comprising:
    a counter electrode;
    a flow passage connected to the counter electrode to deliver a liquid electrolyte having electrochemically active species with multiple, reversible oxidation states;
    at least one working electrode; and
    a separator between the counter electrode and the at least one working electrode, the separator being impermeable to the liquid electrolyte and the electrochemically active species,
    the at least one working electrode being isolated from receiving the electrochemically active species of the liquid electrolyte except for at least one transport passage that comprises an opening through the separator connecting the flow passage and the at least one working electrode, the opening having a first end that opens to the working electrode and a second end that opens to the counter electrode, the opening limiting movement of the electrochemically active species to the at least one working electrode.

13. The secondary cell as recited in claim 12, wherein the at least one transport passage comprises an opening through the separator, wherein the opening is straight.

14. The secondary cell as recited in claim 12, further comprising an ion exchange membrane adjacent the separator.

15. The secondary cell as recited in claim 12, wherein the at least one working electrode includes first and second working electrodes, and the at least one transport passage includes first and second openings through the separator, wherein the first and second openings are straight.

16. The secondary cell as recited in claim 12, wherein the at least one transport passage comprises a bleed line from the flow passage.

17. The secondary cell as recited in claim 12, wherein the at least one transport passage comprises channels in the separator.

18. The secondary cell as recited in claim 12, further comprising a vent passage connected with the at least one working electrode.

* * * * *